United States Patent
Furuya et al.

(10) Patent No.: US 6,774,526 B2
(45) Date of Patent: Aug. 10, 2004

(54) ROTOR FOR SMALL-SIZED MOTOR AND METHOD OF MANUFACTURING SAME

(75) Inventors: Kenji Furuya, Matsudo (JP); Makoto Kimura, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 154 days.

(21) Appl. No.: 10/151,838

(22) Filed: May 21, 2002

(65) Prior Publication Data

US 2002/0185930 A1 Dec. 12, 2002

(30) Foreign Application Priority Data

Jun. 6, 2001 (JP) .......... 2001-171011
Apr. 23, 2002 (JP) .......... 2002-120110

(51) Int. Cl.[7] .......... H02K 1/00
(52) U.S. Cl. .......... 310/233; 310/234; 310/45
(58) Field of Search .......... 310/231–236, 310/44–45

(56) References Cited

U.S. PATENT DOCUMENTS 3,697,792 A * 10/1972 Roue .......... 310/234
4,398,113 A * 8/1983 Lewis et al. .......... 310/232
5,245,240 A * 9/1993 Takasaki .......... 310/237
6,245,166 B1 * 6/2001 Shibuya et al. .......... 148/431

OTHER PUBLICATIONS

Mitsubishi Electric Metecs Co., Ltd., Mar. 1998, *Mitsubishi Electric Copper Alloys*, Catalog and Technical Data.
Japan Industrial Standard (JIS) Committee, Mar. 20, 2000, *JIS Plate and Strip of Copper and Copper Alloy*, JIS.

* cited by examiner

Primary Examiner—Thanh Lam
(74) Attorney, Agent, or Firm—McGlew and Tuttle, P.C.

(57) ABSTRACT

A rotor for a small-sized motor has a plurality of rotor magnetic poles and a commutator on a rotor shaft, and both ends of a wire of each winding of the rotor magnetic poles are tied up with and connected by spot welding to a U-shaped hook-type commutator leg connected to the corresponding commutator piece end of the commutator, respectively. The commutator leg has a copper-based base material, and is composed by attaching a thin layer of a clad material with a melting point lower than that of the above described base material and a high electric resistance thereon at the surface part to be inside when bent to the U-shaped hook type. Thus, in the connection between the commutator leg and the copper wire material of the small-sized motor, the reduction of defectives of breaking of the wire because of heat shock at the time of welding is achieved, and in the meantime, the stabilization of welding is achieved, so that the reliability of the connection can be increased.

8 Claims, 6 Drawing Sheets

(A) Rotor after Winding and before Spot Welding

Commutator (B) Rotor before Winding

Commutator

Commutator

ROTOR FOR SMALL-SIZED MOTOR AND METHOD OF MANUFACTURING SAME

BACKGROUND OF THE INVENTION

1. Field of the Invention

The present invention relates to a rotor for a small-sized motor, which allows the end of a winding coil to be electrically well connected to the leg of a commutator with good workability, and a method of manufacturing the same.

2. Description of the Related Art

The conventional connection of each commutator piece and a winding coil end will be described by referring to FIG. 5. FIG. 5 is a perspective view of the commutator part of a small-sized motor. In the figure, reference numeral 11 denotes a shaft of the rotor, and reference numeral 22 denotes a commutator piece, and reference numeral 24 denotes a commutator core, and reference numeral 26 denotes a commutator leg. Thus, the commutator comprises each commutator piece 22 which is arranged on a resin commutator core 24, and a commutator leg 26 which is formed integrally with each commutator piece 22 at the end thereof for connecting the winding coil end. FIG. 6 is a side view of the commutator part shown in FIG. 5, and shows the state where the winding coil end is connected. The commutator leg 26 is bent to the commutator piece to hold the winding coil end as shown in the figure, and spot welding is applied.

FIG. 7 is a view showing only a varistor taken out on the right side in the figure, and showing the state where that varistor is attached and connected on the left side. In the case of a small-sized motor with a commutator, when the brush which comes into sliding contact with the commutator passes between the commutator pieces, an arc is produced, and by this arc, radio wave hindrance may be given to the communication devices, or the life of the brush may be reduced. Therefore, it is conventionally well known that a varistor is attached to the rotor of a motor as a spark quenching element. One example of such a varistor has a shape shown on the right side in FIG. 7, and totally, it is shaped like a toroidal disk, and has electrodes of the number of the rotor magnetic poles, that is, the number equal to that of the commutator pieces. Each electrode of this varistor 21 is separately soldered to each commutator leg 26. By this soldering, the varistor 21 is not only electrically connected but also mechanically fixed coaxially to the commutator.

To the wire as a conductive material which is used for electronic parts such as a winding coil of a small-sized motor, coating is usually applied with insulating materials such as polyurethane or polyester to form an insulating coating film. In the case of a winding coil of a small-sized motor, it is necessary that the end thereof is connected electrically and mechanically to each commutator leg, but conventionally, the melting point of the commutator leg and that of the copper wire material are almost the same, and an insulating coating film exists, and therefore, the inside surface of the bent commutator leg has been made to be an unsmooth surface where fine irregularities are made (so-called star marking: making small star-shaped recesses), and furthermore, heat shock has been applied by spot welding to perform the coating film separation and the connection. However, this method is a factor to cause breaking of the wire, and therefore, as shown in FIG. 4, the breaking of the wire because of the heat shock has been moderated in such a way that solder plating is applied to the bent inside part of the commutator terminal in advance to hold the copper wire material.

However, as mentioned above by referring to FIG. 7, there has been such a problem that when soldering the varistor 21, the solder on the inside of the bent commutator leg is also melted by the heat thereof, and after that, at the time of cooling and solidification, the bent tip part is opened. This is caused for the reason that the amount of solder is larger on the varistor connection side, and furthermore, the spring back of the bent part also acts to pull the bent tip part of the commutator terminal to the varistor side on the outside at the time of solder cooling.

Furthermore, there is also such a problem that by the heat at the time of spot welding or soldering, the insulating coating film may be burnt to produce a poisonous gas, so that the need for the environmental countermeasure is produced. Moreover, the solder is a heavy metal, and the need for the environmental countermeasure is wanted to the soldering itself.

SUMMARY OF THE INVENTION

Therefore, it is an object of the present invention to solve such problems, so that the reduction of defectives of breaking of the wire because of heat shock at the time of welding is achieved in the connection between the commutator leg and the copper wire material of a small-sized motor, and in the meantime, to make it possible to select the most suitable one as the material to be welded to the copper wire material regardless of many kinds of materials of the commutator leg used for the motor commutator, so that the stabilization of welding is achieved, and the reliability of connection is increased.

Furthermore, it is an object of the present invention to eliminate the need for the solder plating and star marking to simplify the work process in the connection between the commutator leg and the copper wire material of a small-sized motor.

Furthermore, it is an object of the present invention to provides rotor for a small-sized motor wherein the solder plating is eliminated, and furthermore, a poisonous gas from the insulating coating film because of heat is restrained to correspond to the environment.

The rotor for a small-sized motor of the present invention has a plurality of rotor magnetic poles and a commutator on a rotor shaft, and both ends of a wire of each winding of the above described rotor magnetic poles are tied up with and connected by welding to a commutator leg connected to the corresponding commutator piece end of the commutator, respectively. The commutator leg has a copper-based base material, and is composed by attaching a thin layer of a clad material with a lower melting point and higher electric resistance than that of the above described base material on that at least at a portion of the surface part with which the winding wire comes into contact for welding.

Furthermore, in the method of manufacturing a rotor for a small-sized motor, a plurality of rotor magnetic poles and a commutator are mounted on a rotor shaft, and both ends of a wire of each winding of the above described rotor magnetic poles are tied up to the commutator leg connected to the corresponding commutator piece end of the commutator, and after that, they are heated by welding and connected. A copper-based base material is prepared, and a clad material with a melting point lower than that of the above described base material and a high electric resistance is attached to the base material at least at a portion of the surface part with which the winding wire comes into contact for welding. The commutator leg is formed by this base material to which the clad material is attached.

DETAILED DESCRIPTION OF THE PREFERRED EMBODIMENTS

Figure 1:
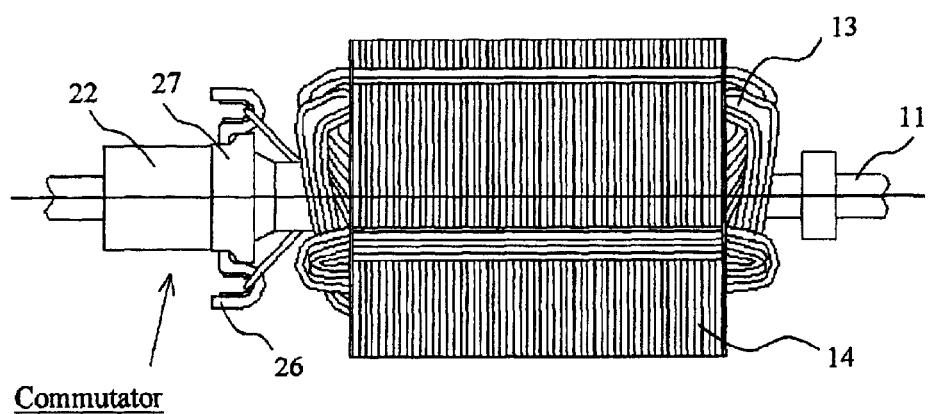
FIG. 1 is a view showing the structure of a rotor for a small-sized motor to which the present invention can be applied, and (A) shows the rotor after winding and before spot welding, and (B) shows the rotor before winding.
Figure 1:
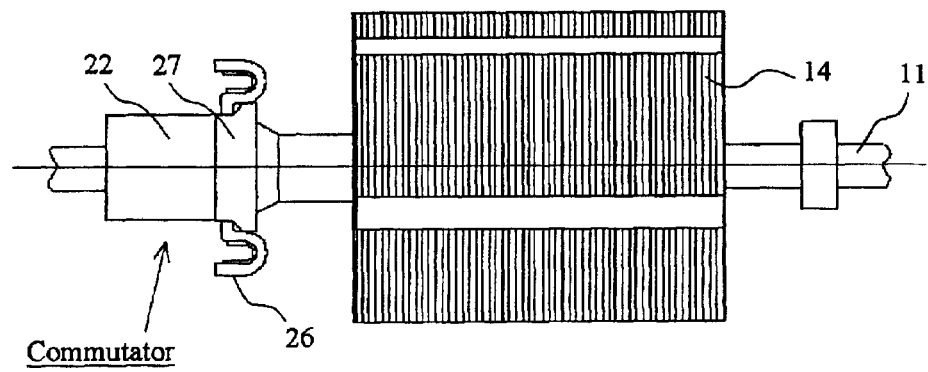

FIG. 1 is a view showing the structure of a rotor for a small-sized motor to which the present invention can be applied. FIG. 1(A) shown on the upper side in the figure shows the rotor after winding and before spot welding, and FIG. 1(B) on the lower side shows the rotor before winding. The illustration of the structure on the stator side is omitted, but a normal one can be used. For example, into a hollow cylindrical metal case with a bottom having two magnets attached to the inside peripheral surface, the rotor shown in the figure is inserted, and after that, a case lid is fitted to the opening part of the metal case, so that a small-sized motor can be completed. At that moment, a shaft 11 of the rotor is supported at both ends by both bearings which are set at the center of the bottom part of the case and the case lid, respectively. Furthermore, as usual, a brush supported by the case lid is set. This brush comes into sliding contact with the commutator on the rotor, and in the meantime, it is connected to the input terminal projecting through the case lid, so that power source can be supplied from the outside.

Furthermore, on the rotor shaft 11, a plurality of rotor magnetic poles with salient pole structure are normally constructed, and attached. This rotor magnetic pole is normally constructed by a winding 13 wound on a laminated core 14. Both ends of each of the windings whose number is equal to the number of magnetic poles are connected by spot welding to commutator legs 26 which are connected electrically and mechanically to corresponding commutator pieces 22, which will be described in detail later. As a result of that, the winding wire is welded and connected to the commutator leg 26. Furthermore, when a varistor is attached, it can be attached similarly to the prior art described by referring to FIG. 7. The welding by spot welding is performed at a temperature higher than that of solder, and therefore, it is not caused for the welded part to be separated at the time of soldering.

Figure 5:
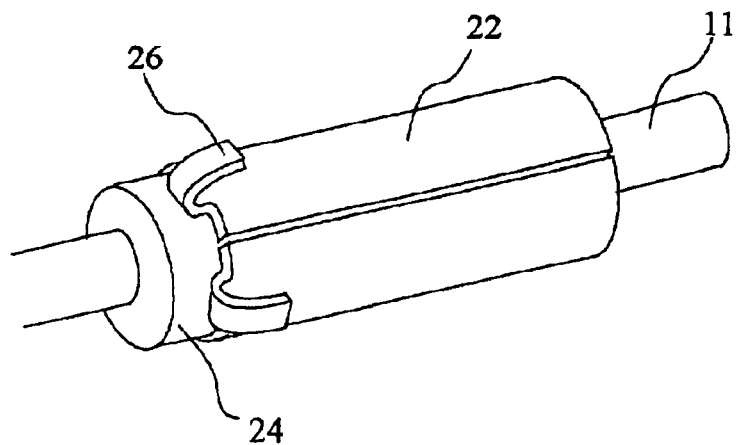
FIG. 5 is a perspective view of a commutator of a small-sized motor of the prior art.
Figure 6:
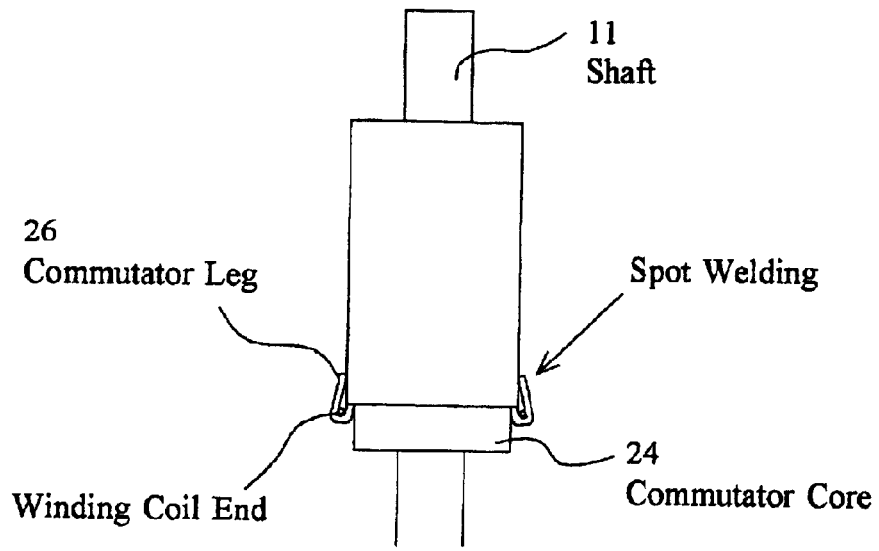
FIG. 6 is a view of the side view of the commutator shown in FIG. 5, and shows the state where a winding coil end is connected.
Figure 7:
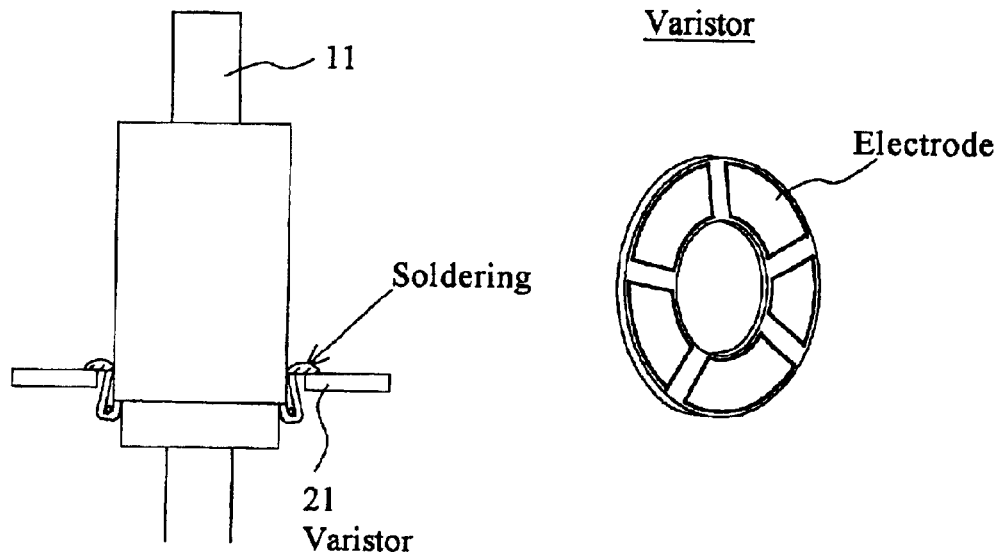
FIG. 7 is a view showing only a varistor taken out on the right side in the figure, and showing the state where the varistor is attached and connected on the left side.

The structure itself of the commutator to be attached on the rotor shaft can be a structure similar to that of the prior art described by referring to FIG. 5 to FIG. 7. The commutator part shown in FIG. 1 includes each commutator piece 22 arranged on a resin commutator core (not shown in the figure) and a commutator leg 26 which is connected to each commutator piece for connecting the winding coil end. Furthermore, as shown in the figure, it is possible that a resin holding part 27 for holding and positioning the commutator leg 26 is formed and set integrally with the commutator core positioned under the commutator piece 22. It is possible that each commutator leg 26 is made by being formed integrally with the corresponding commutator piece 22 and by being bent from the winding side end of the commutator piece, or it can also be formed by fixing a separately formed commutator leg 26 to the commutator piece end. This commutator leg 26 is bent and formed to be a U-shaped hook type, and to the bottom part of that U-shaped hook, a copper wire material which is the winding coil end is tied up, and after that, the copper wire material is welded by spot welding while bringing an electrode into contact from the outside of the above described U-shaped hook type commutator leg and applying pressure.

At the time of this welding, in the case of the present invention, a thin layer of a clad material made of a material such as phosphor bronze which has a lower melting point and higher electric resistance than that of the copper material is attached at least at a portion of the surface part with which the winding wire comes into contact for welding, that is, on the inside bent of the U-shaped hook type commutator leg, and therefore, breaking of the wire of the copper wire material is not caused, and the welding can be performed so that the clad material which starts to melt before wraps the copper wire material.

The welding of the copper wire material to the U-shaped hook type commutator leg which is the characteristic of the present invention will furthermore be described below by referring to FIG. 2 and FIG. 3. First of all, in FIG. 2, as a commutator leg, one where a clad material made of phosphor bronze or the like is attached on the surface of a base material is used. The base material can be a material which has been used conventionally as the commutator leg material, and it is formed by a material which is most suitable for achieving the function as a commutator leg, and furthermore the function of a commutator piece to be connected thereto, that is, a copper-based material. For a clad material, a material which has a melting point lower than those of this base material and the copper wire material to be welded, and a high electric resistance, for example, phosphor bronze is used. By increasing electric resistance, sufficient heat can be produced by the current flowing at the time of spot welding. The clad material can be a thin layer with a thickness of, for example, about 0.05 to 0.1 mm. Furthermore, the melting point of copper is 1080° C., and the melting point of phosphor bronze containing tin of 8% is 1027° C., and the melting point of solder is about 250 to 280° C. Furthermore, the electric resistance of phosphor bronze is about 6 to 9 times the electric resistance of copper.

Next, the action in the case where an alloy is used as a clad material will be described. The alloy has a liquid phase point and a solid phase point, and therefore, produces a more excellent effect as a clad material. Here, the liquid phase point and the solid phase point will be described. The solid phase point means a temperature at which metal starts to melt, and the liquid phase point means a temperature at which metal becomes completely liquid. For example, in the case of phosphor bronze containing tin of 8%, the liquid phase point is a little over 1027, and the solid phase point is a little over 880. The above described meting point means the liquid phase point. At the time of spot welding, when the clad material is an alloy, half-melting state is made. This half-melting clad material melts the insulating coating film, and is connected to the commutator leg to wrap the copper wire material. At this moment, when the clad material is half melted, the wrapping is more completely performed.

When the clad material becomes liquid completely, the clad material spills out of the commutator leg, which goes without saying, and the connection between the commutator leg and the copper wire material cannot be performed. Accordingly, setting of the spot condition (temperature and time) is important. When the width between the liquid phase point and the solid phase point has some size, the setting of the spot condition (temperature and time) at the time of production becomes easy. From this viewpoint, phosphor bronze also satisfies the above described factor since it has a width between the liquid phase point and the solid phase point, which is a little over 100 or more.

Such a clad material is attached to the surface of the base material at the part to be inside when the commutator leg is bent, before the commutator leg is bent to form the U-shaped hook. This attachment can be performed, for example, by applying pressure while applying heat. This base material to which the clad material is attached is bent to form the U-shaped hook type commutator leg, and a wire material is passed through that and tied up, and after that, the U-shaped hook type commutator leg is subjected to spot welding while an electrode comes into contact from the outside thereof to apply pressure. At this moment, the clad conductive part with a lower melting point and higher electric resistance than that of the copper material starts to melt before, and is welded to wrap the copper wire material.

In the case where the insulating coating film of the copper wire material has a low melting point, the U-shaped hook type commutator leg and the copper wire material can be connected by making the U-shaped hook type commutator leg generate heat by spot welding after tying up the copper wire material to the U-shaped hook type commutator leg. In the case of a copper wire material having an insulating coating film with a high melting point, the insulating coating film at the connecting part of the U-shaped hook type commutator leg and the copper wire material is removed mechanically, for example, by the method where the insulating coating film is sliced by rotating a cutter, before the copper wire material is tied up to the U-shaped hook type commutator leg, and then, the copper wire material is tied up to the U-shaped hook type commutator leg. The material thereof can actually made to be only a material of one kind of copper by eliminating the insulating coating film, and furthermore, the connection can be performed under the most suitable spot welding condition, by selecting the most suitable clad material for various kinds of materials of the commutator leg. Consequently, it is possible to unify many kinds of materials of the commutator leg which are arranged by the kind of the wire of the insulating coating film copper wire material, and furthermore, arranging and unifying of the condition of production become possible. Furthermore, by removing the insulating coating film in advance, creation of a poisonous gas is also eliminated.

Figure 2:
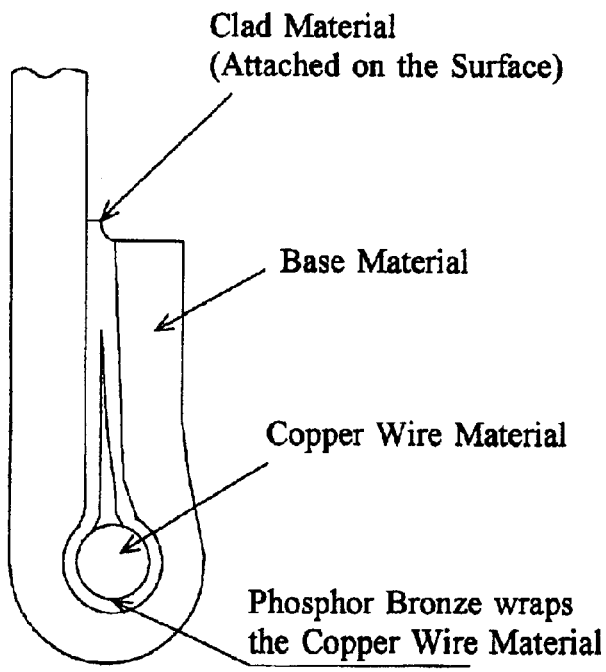
FIG. 2 is a view for explaining the welding of a copper wire material to a U-shaped hook type commutator leg which is the characteristic of the present invention.
Figure 3:
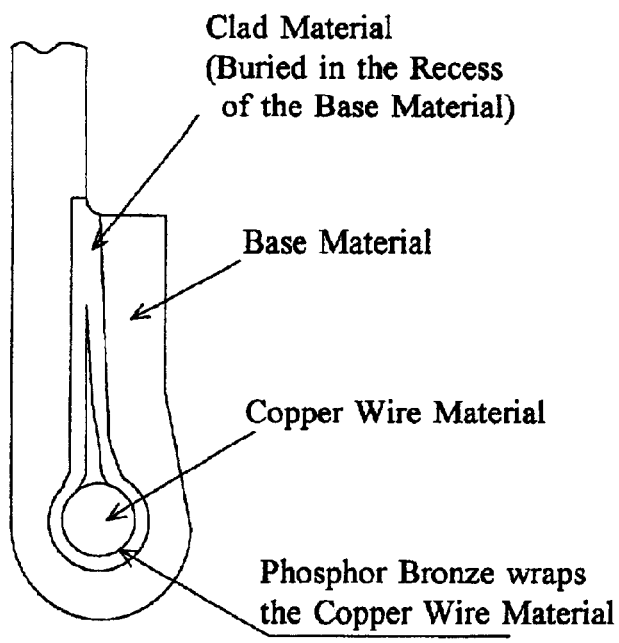
FIG. 3 is a view similar to FIG. 2, but a view showing another example.

FIG. 3 is a view similar to FIG. 2, but it is different only in the attaching method of a clad material. In this example, the clad material is subjected to thermo compression bonding after being buried in the base material. In the case of this clad material, before the commutator leg is bent to form the U-shaped hook, a recess is formed in the surface of the base material at the part to be inside when the commutator leg is bent, for example, by using a pressure roller, and it is buried in this recess. This burying can be performed similarly to the example in FIG. 2, for example, by thermo compression bonding/thermo pressure welding where pressure is applied while heat is applied. In the case of the example shown in the view, the process for forming a recess is necessary, but the compression bonding can be made surer. After that, similarly to the example shown in FIG. 2, this base material where the clad material is buried is bent to the inside to compose a U-shaped hook type commutator leg, and a wire material is inserted there, and pressure is applied to the U-shaped hook type commutator leg by spot welding, and the clad conductive part whose melting point is lower than that of the copper material starts to melt before, and is welded to wrap the copper wire material.

Figure 4:
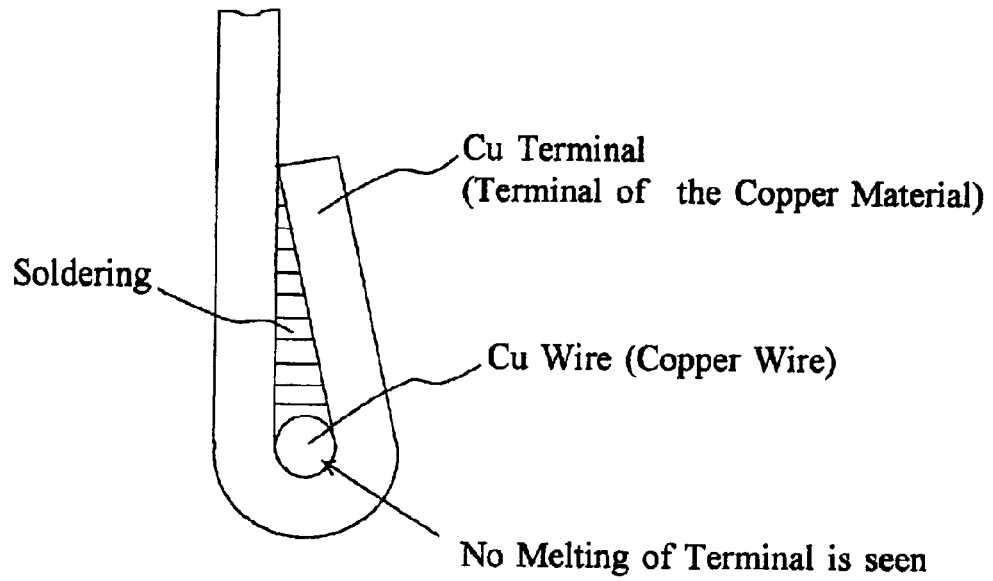
FIG. 4 is a view showing the prior art of connecting a copper wire and a copper terminal.

This welding of the copper wire material which is the characteristic of the present invention will furthermore be described while referring to the prior art shown in FIG. 4. FIG. 4 shows the prior art of spot welding of the copper wire and the U-shaped copper terminal (commutator leg). Both the copper wire and the copper terminal are made of copper, and have the same melting point, and therefore, melting-in of the terminal cannot be recognized, and furthermore, in some cases breaking of the wire may be caused at the time of welding connection. When the temperature becomes the melting point of copper or more, the copper terminal may melt, but at that moment, it may happen that not only the copper terminal but also the copper wire melts. On the other hand, as shown in FIG. 2 or FIG. 3, when for example, phosphor bronze is used as the clad material, only the phosphor bronze clad material melts since the melting point of phosphor bronze is lower than that of copper and the electric resistance of the phosphor bronze terminal is high, and it melts in to wrap the copper wire.

Figure 8:
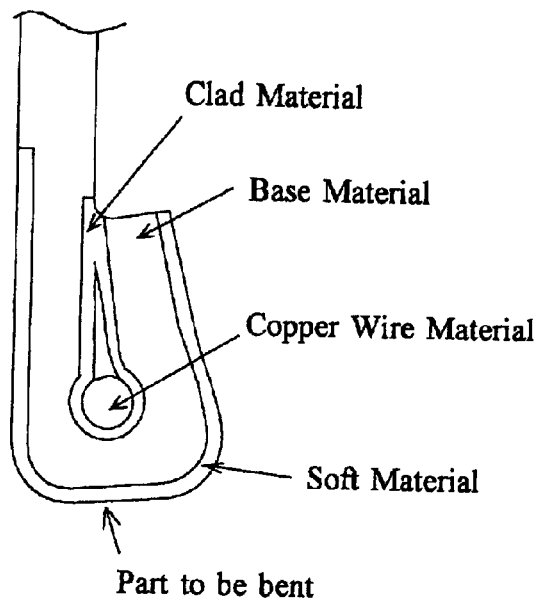
FIG. 8 is a view similar to FIG. 2 or FIG. 3, but a view showing furthermore another example.

FIG. 8 is a view similar to FIG. 2 or FIG. 3, but it is a view furthermore showing another example. At the time of spot welding, the U-shaped hook type commutator leg of the commutator is bent. At that moment, in vary rare cases, a crack may be caused at the bent part of the U-shaped hook type commutator leg ("part to be bent" which is positioned at the lower part in FIG. 8). For decreasing the possibility of this crack to the minimum, in the case of the structure shown in FIG. 8, a material softer than the copper base material is attached to the outside of the copper base material (part to be outside when being bent). For example, in the case where C7250 (appearing in the catalog of the alloy products of MITSUBISHI ELECTRIC) is used as the copper base material, oxygen-free copper (C1020 in JIS) or the like is attached as a soft material. According to this structure, it is possible to prevent a crack from being produced at the bent part of the U-shaped hook type commutator leg at the time of spot welding.

Figure 9:
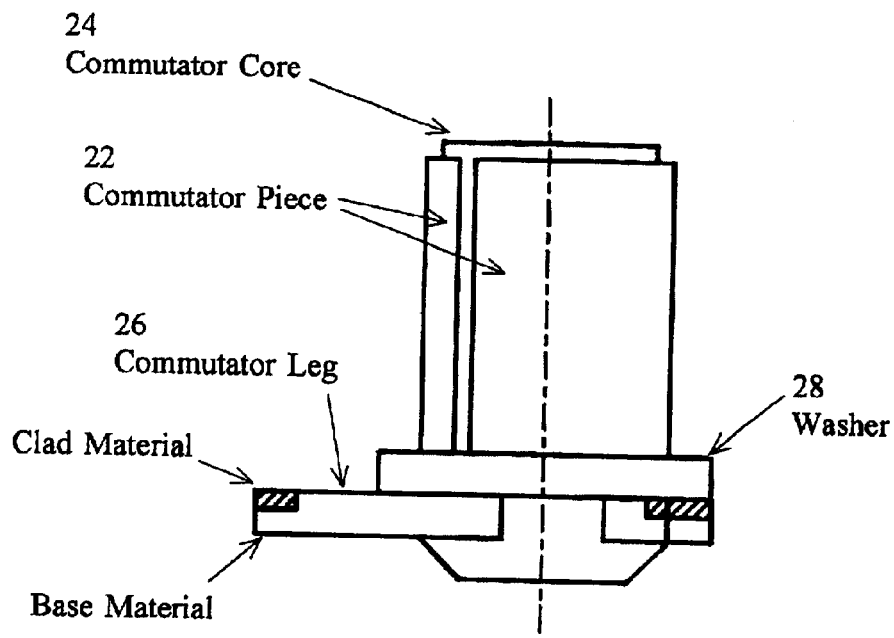
FIG. 9 is a view showing another example of the commutator to which the present invention is applied, and is a view of the commutator which is seen from the outside in the radial direction in the state where the axial direction is vertically arranged.
Figure 10:
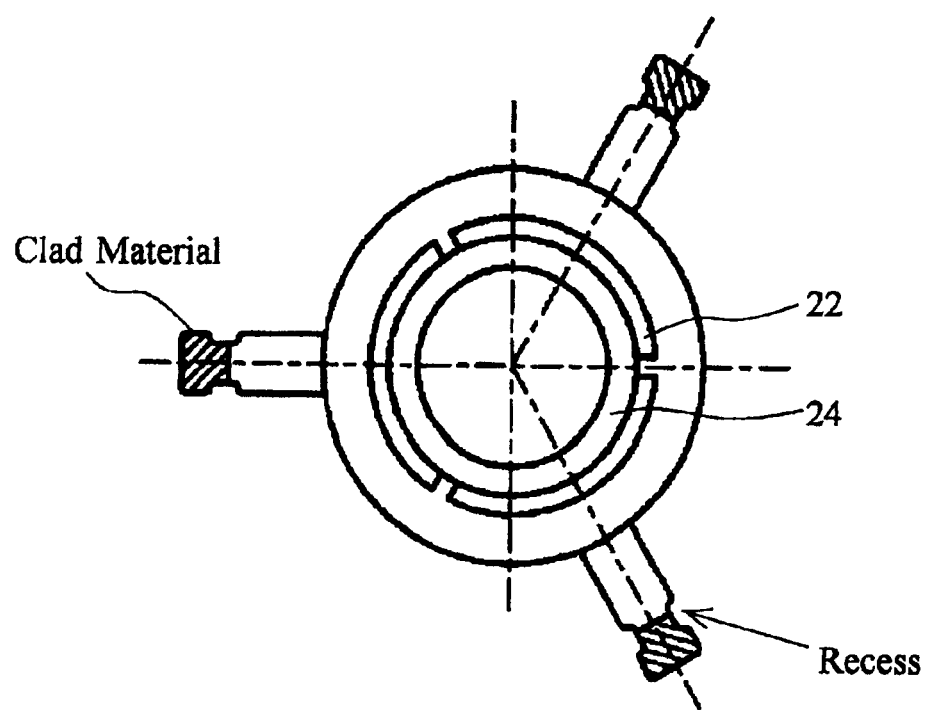
FIG. 10 is a view of the commutator shown in FIG. 9 which is seen from the tip side in the axial direction.

FIG. 9 and FIG. 10 are views showing another example of the commutator to which the present invention is applied, and FIG. 9 is a view of the view from the outside in the radial direction in the state where the axial direction of the commutator is vertically arranged in the figure, and FIG. 10 is a view of the view where the commutator shown in FIG. 9 is seen from the tip side in the axial direction. Similarly to the example shown in FIG. 1, the commutator includes each commutator piece 22 which is arranged on the resin commutator core 24 and a commutator leg 26 which is connected to each commutator piece 22 for connecting the winding coil end. Furthermore, as shown in the figure, a washer 28 is prepared for holding and positioning each commutator piece 22 and a commutator leg 26 connected thereto on the commutator core 24. It is possible that each commutator leg 26 is formed integrally with the corresponding commutator piece 22 and is formed by being bent at right angles from the winding side end of the commutator piece, or it can be formed by fixing a separately formed commutator leg 26 to the commutator piece end, which is similar to the example shown in FIG. 1.

In the example shown in FIG. 9 and FIG. 10, the commutator leg 26 is not bent to be a U-shaped hook type, but is formed like a straight long narrow plate. It is also possible that the present invention is applied to the commutator leg with such a structure to attach a clad material such as phosphor bronze which has a lower melting point and higher electric resistance than that of the base material. It is preferable that the attaching position is at least a portion of the surface part where the winding wire comes into contact for welding, and the upper surface (surface on the opposite side of the winding in the shaft axial direction) of the tip part of the commutator leg 26.

In the case of this example, in the connection of the winding and the commutator leg 26, first of all, the insulating coating film of the winding is removed, and the part where the insulating coating film of the winding is removed is tied up to the commutator leg 26, and arc welding is performed. Consequently, the winding and the commutator are connected. At this moment, if a recess (refer to FIG. 10) where the width is narrowed is formed at the winding connecting part of the commutator leg 26, the displacement of the winding can be prevented when tying up the winding.

As described above, in the case of the present invention, the commutator leg is formed by attaching a material whose melting point is lower than those of the base material and the copper wire material and whose electric resistance is high to the base material, and therefore, there is such an effect that when heating the commutator leg by welding, the clad conductive part with a lower melting point starts to melt before, and is welded to wrap the copper wire material.

Furthermore, there is such an effect that by removing the insulating coating film before tying up the copper wire material to the commutator leg, and by making the material thereof be actually only one kind of copper, the most suitable one can be selected as the material of the clad material of the commutator leg to be welded thereto, and the reliability of the connection can be increased, and in the meantime, the production of a poisonous gas from the insulating coating film because of heat can be restrained to correspond to the environment.

Furthermore, the conventional solder plating or star marking becomes unnecessary since the connection is performed by using difference between the melting points of the copper wire material and the clad material, and the occurrence of breaking of the wire because of the star marking and the heat shock is reduced, and by removing the insulating coating film in advance, the production of a poisonous gas from the insulating coating film because of heat is restrained, which is favorable to the environmental countermeasure.

What is claimed is:

1. A rotor for a small-sized motor, comprising:
   a plurality of rotor magnetic poles;
   a commutator; and
   a rotor shaft, said rotor magnetic poles and said commutator being mounted on said rotor shaft, both ends of a wire of each winding of said rotor magnetic poles being tied up with and connected by welding to a commutator leg which is connected to a corresponding commutator piece end of the commutator, wherein
   said commutator leg has a copper-based base material and a thin layer of a clad material with a lower melting point and higher electric resistance than that of said base material, and said clad material is attached to said base material at least at a portion of the surface part with which the wire of said winding comes into contact for welding.

2. The rotor for a small-sized motor according to claim 1, wherein said commutator leg is adapted to be a U-shaped hook type, and said clad material is attached to said base material at the surface part which becomes inside when said commutator leg is bent to be a U-shaped hook type.

3. The rotor for a small-sized motor according to claim 2, wherein a material softer than the base material is attached to the outside of said commutator leg of a U-shaped hook type.

4. The rotor for a small-sized motor according to claim 3, wherein said soft material is oxygen-free copper.

5. The rotor for a small-sized motor according to claim 1, wherein said commutator leg is adapted to be a straight plate, and said clad material is attached to said base material at the surface which is the tip part of said commutator leg and on the opposite side of the side where the winding is positioned.

6. The rotor for a small-sized motor according to claim 1, wherein said clad material comprises phosphor bronze.

7. The rotor for a small-sized motor according to claim 1, wherein a recess which corresponds to the clad material to be attached there is formed in advance at the surface part of said base material.

8. The rotor for a small-sized motor according to claim 1, wherein at the wire part to be tied up to said commutator leg, an insulating coating film thereof is removed in advance.

* * * * *